US011366654B2

(12) United States Patent
Amiga et al.

(10) Patent No.: US 11,366,654 B2
(45) Date of Patent: *Jun. 21, 2022

(54) APPLICATION MANAGEMENT WITHIN DEPLOYABLE OBJECT HIERARCHY

(71) Applicant: Microsoft Technology Licensing, LLC, Redmond, WA (US)

(72) Inventors: Ori Amiga, Seattle, WA (US); John MacIntyre, Seattle, WA (US); Dharma Shukla, Sammamish, WA (US); Junfeng Zhang, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/194,960

(22) Filed: Mar. 8, 2021

(65) Prior Publication Data

US 2021/0357200 A1 Nov. 18, 2021

Related U.S. Application Data

(63) Continuation of application No. 16/696,391, filed on Nov. 26, 2019, now Pat. No. 10,970,062, which is a continuation of application No. 15/666,145, filed on Aug. 1, 2017, now Pat. No. 10,514,901, which is a continuation of application No. 12/052,550, filed on Mar. 20, 2008, now Pat. No. 9,753,712.

(51) Int. Cl.
*G06F 9/445* (2018.01)
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .......................................................... G06F 8/65
USPC ....................................................... 717/176
See application file for complete search history.

(56) References Cited

U.S. PATENT DOCUMENTS

| 5,504,852 A * | 4/1996 | Thompson-Rohrlich .................... G06F 16/10 715/835 |
| 6,243,746 B1 * | 6/2001 | Sondur ................. G06F 11/327 709/220 |

(Continued)

*Primary Examiner* — Francisco J Aponte
(74) *Attorney, Agent, or Firm* — Fiala & Weaver P.L.L.C.

(57) ABSTRACT

The management of applications in a computing environment often involves a significant number of computing operations, such as acquiring the application, deploying data objects in various locations, and configuring the application with respect to the deployed device. Conventional computing environments may provide inadequate support throughout a typical application life cycle, especially for a computing environment distributed across many devices. Instead, the computing environment may be represented in a deployable object hierarchy that may be distributed to various devices. An application management service may therefore be provided to install representations of the application in the object hierarchy, and to support many other aspects of the application life cycle, such as application discovery, sharing, updating, and removal. The devices may therefore provide the applications of the computing environment to the user in a consistent manner with reduced manual management among the devices comprising the computing mesh.

20 Claims, 8 Drawing Sheets

(56) References Cited

U.S. PATENT DOCUMENTS

| | | | | |
|---|---|---|---|---|
| 6,286,138 | B1* | 9/2001 | Purcell | G06F 8/65 709/203 |
| 6,330,717 | B1* | 12/2001 | Raverdy | G06F 8/24 717/170 |
| 6,834,301 | B1* | 12/2004 | Hanchett | H04L 41/0233 705/1.1 |
| 6,836,842 | B1* | 12/2004 | Guccione | G06F 15/7867 713/100 |
| 6,865,737 | B1* | 3/2005 | Lucas | G06F 8/61 717/178 |
| 7,117,243 | B2* | 10/2006 | Peart | G06F 9/547 709/203 |
| 7,117,495 | B2* | 10/2006 | Blaser | G06F 8/61 717/174 |
| 7,353,259 | B1* | 4/2008 | Bakke | G06F 9/44505 709/208 |
| 7,383,541 | B1* | 6/2008 | Banks | G06F 8/65 717/126 |
| 7,480,699 | B2* | 1/2009 | Alam | G06F 8/656 709/217 |
| 7,516,206 | B2* | 4/2009 | Henseler | G06F 8/63 709/201 |
| 7,546,594 | B2* | 6/2009 | McGuire | G06F 8/658 717/172 |
| 7,574,706 | B2* | 8/2009 | Meulemans | H04L 67/34 717/176 |
| 7,739,680 | B1* | 6/2010 | Thakur | G06F 8/656 717/172 |
| 7,890,543 | B2* | 2/2011 | Hunt | G06F 9/465 707/803 |
| 8,185,891 | B2* | 5/2012 | DeHaan | G06F 8/61 717/177 |
| 8,290,762 | B2* | 10/2012 | Kodosky | G06F 3/04817 703/23 |
| 8,321,538 | B2* | 11/2012 | Ford | G06F 15/16 709/220 |
| 8,387,037 | B2* | 2/2013 | Henseler | G06F 8/63 717/168 |
| 9,152,404 | B2* | 10/2015 | Reeves | G06F 1/1616 |
| 2002/0010807 | A1* | 1/2002 | Multer | G06F 16/182 719/328 |
| 2002/0029227 | A1* | 3/2002 | Multer | G06F 16/182 |
| 2003/0225851 | A1* | 12/2003 | Fanshier | G06F 8/61 709/208 |
| 2004/0031029 | A1* | 2/2004 | Lee | G06F 8/65 717/171 |
| 2004/0085947 | A1* | 5/2004 | Ekberg | H04W 48/16 370/349 |
| 2005/0004985 | A1* | 1/2005 | Stochosky | H04L 69/329 709/205 |
| 2005/0060581 | A1* | 3/2005 | Chebolu | G06F 9/44505 726/4 |
| 2005/0091348 | A1* | 4/2005 | Ferri | G06F 8/60 709/220 |
| 2006/0089965 | A1* | 4/2006 | Fontes | H04L 67/1002 709/203 |
| 2006/0130050 | A1* | 6/2006 | Betts | G06F 9/44505 717/171 |
| 2006/0173895 | A1* | 8/2006 | Engquist | G06F 9/5061 |
| 2006/0173993 | A1* | 8/2006 | Henseler | G06F 8/63 709/224 |
| 2006/0200494 | A1* | 9/2006 | Sparks | H04L 41/12 |
| 2006/0242327 | A1* | 10/2006 | Knight | G06F 16/958 709/248 |
| 2007/0169049 | A1* | 7/2007 | Gingell | G06F 8/61 717/151 |
| 2007/0169083 | A1* | 7/2007 | Penubolu | G06F 11/1658 717/168 |
| 2007/0233698 | A1* | 10/2007 | Sundar | G06F 11/2025 |
| 2008/0016505 | A1* | 1/2008 | Bucklew | G06F 8/34 717/174 |
| 2008/0040511 | A1* | 2/2008 | Messer | H04L 67/1095 709/248 |
| 2008/0057992 | A1* | 3/2008 | Griffin | H04W 8/186 455/518 |
| 2008/0130639 | A1* | 6/2008 | Costa-Requena | H04L 67/16 370/389 |
| 2008/0155523 | A1* | 6/2008 | Kornmann | G06F 9/451 717/168 |
| 2008/0201453 | A1* | 8/2008 | Assenmacher | H04L 29/06 709/219 |
| 2008/0276181 | A1* | 11/2008 | Moromisato | H04L 67/1097 715/740 |
| 2009/0150878 | A1* | 6/2009 | Pathak | G06F 8/65 717/172 |
| 2009/0164987 | A1* | 6/2009 | Scholz | G06F 9/542 717/168 |
| 2009/0172637 | A1* | 7/2009 | Parikh | G06F 8/427 717/114 |
| 2011/0246977 | A1* | 10/2011 | Parsons | G06F 8/65 717/171 |
| 2014/0325502 | A1* | 10/2014 | Zarifis | G06F 8/61 717/177 |

* cited by examiner

APPLICATION MANAGEMENT WITHIN DEPLOYABLE OBJECT HIERARCHY

CROSS-REFERENCE TO RELATED APPLICATIONS

This is a continuation of U.S. patent application Ser. No. 16/696,391, entitled "APPLICATION MANAGEMENT WITHIN DEPLOYABLE OBJECT HIERARCHY", filed on Nov. 26, 2019, which is a continuation of U.S. patent application Ser. No. 15/666,145, entitled "APPLICATION MANAGEMENT WITHIN DEPLOYABLE OBJECT HIERARCHY", filed on Aug. 1, 2017 and issued as U.S. Pat. No. 10,514,901 on Dec. 24, 2019, which is a continuation of U.S. application Ser. No. 12/052,550, entitled "APPLICATION MANAGEMENT WITHIN DEPLOYABLE OBJECT HIERARCHY", filed on Mar. 20, 2008 and issued as U.S. Pat. No. 9,753,712, the entire contents of which are incorporated herein by reference for all purposes.

BACKGROUND

Many computing environments comprise a large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

Application management within conventional computing environments often involves considerable user involvement. For example, a user may independently discover a desired application, and may procure an installer package, such as a setup executable or a CD-ROM containing setup files. The user may then utilize an application installer that facilitates the deployment of the application in the computing environment, such as by copying files to specific locations and creating registration information. However, following application deployment, computing environments typically provide little ongoing support for the application, sometimes comprising only an uninstaller application. Common maintenance tasks such as execution, sharing, synchronization, and updating are commonly relegated to the application. Moreover, the deployment of the application on one computer system or device rarely enables or facilitates the deployment of the application on other computer systems or devices, even if operated by the same user and utilized for a common purpose on two or more such platforms.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The organization of objects within a computing system as a disjointed, loosely aggregated set of object systems may create several problems. For example, it may be difficult to present a consistent computing environment to the user through various devices, especially if the devices vary in capabilities (e.g., a high-performance personal workstation, a browser-based public terminal, and a low-performance cellphone device.) As another example, applying services to the objects, such as synchronization and backup, may involve interfacing with each object system to affect the objects managed thereby, and such interfacing may vary among object systems. As a third example, relating a diverse set of objects (such as all of the objects comprising an application) may be difficult due to the incomplete cooperation of the managing object systems.

An alternative technique for representing the objects comprising the computing environment involves organizing the objects in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.)

Within an object hierarchy of this nature, application management tasks may be performed. The computing environment host may facilitate the acquisition of the application, the association of the application with a device, and the deployment of the application on the device. The representation of the application as a set of objects in the deployable object hierarchy may facilitate common application management tasks. As a first example, the application may be readily deployed, and in many scenarios automatically deployed, on a plurality of computer systems and devices that are represented in the object hierarchy. For instance, a first version of the application may be deployed to a workstation; a second version of the application may be deployed as a web or web-enabled application for use with a public terminal; and a third version of the application may be deployed as a reduced-functionality application for use on a low-power cellphone device. As a second example, the computing environment host may facilitate the updating of the application (e.g., patching of application resources with updated versions, or deployment of new content for use with the application) by accordingly adjusting the object hierarchy and deploying the adjustments to the devices by synchronizing the hosted and deployed versions of the object hierarchy.

Moreover, the representation of the application as a set of objects in the deployable object hierarchy may also enable new features. As a first example, the computing environment may enable a user to share an application with a second user, or an aspect of an application session, by deploying a specific portion of the object hierarchy to the second user's device, computer system, or computing environment host. For instance, a first user may choose a set of song objects to play on a first computer through a media player application, and may choose to share the media player application session with a second user (e.g., by streaming the audio of the media player application to the second user.) As a second example, the configuration of the application may be synchronized across devices and computer systems as part of the object hierarchy. Device-independent application properties (e.g., custom words added to a spell-check dictionary) may be automatically propagated to all such devices and computer systems, while device-specific application properties may be specified for respective devices by the computing environment host. In this manner, the application management service of the computing environment host may support the discovery, deployment, use, and removal of applications on various computer systems and devices operated by one or more user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
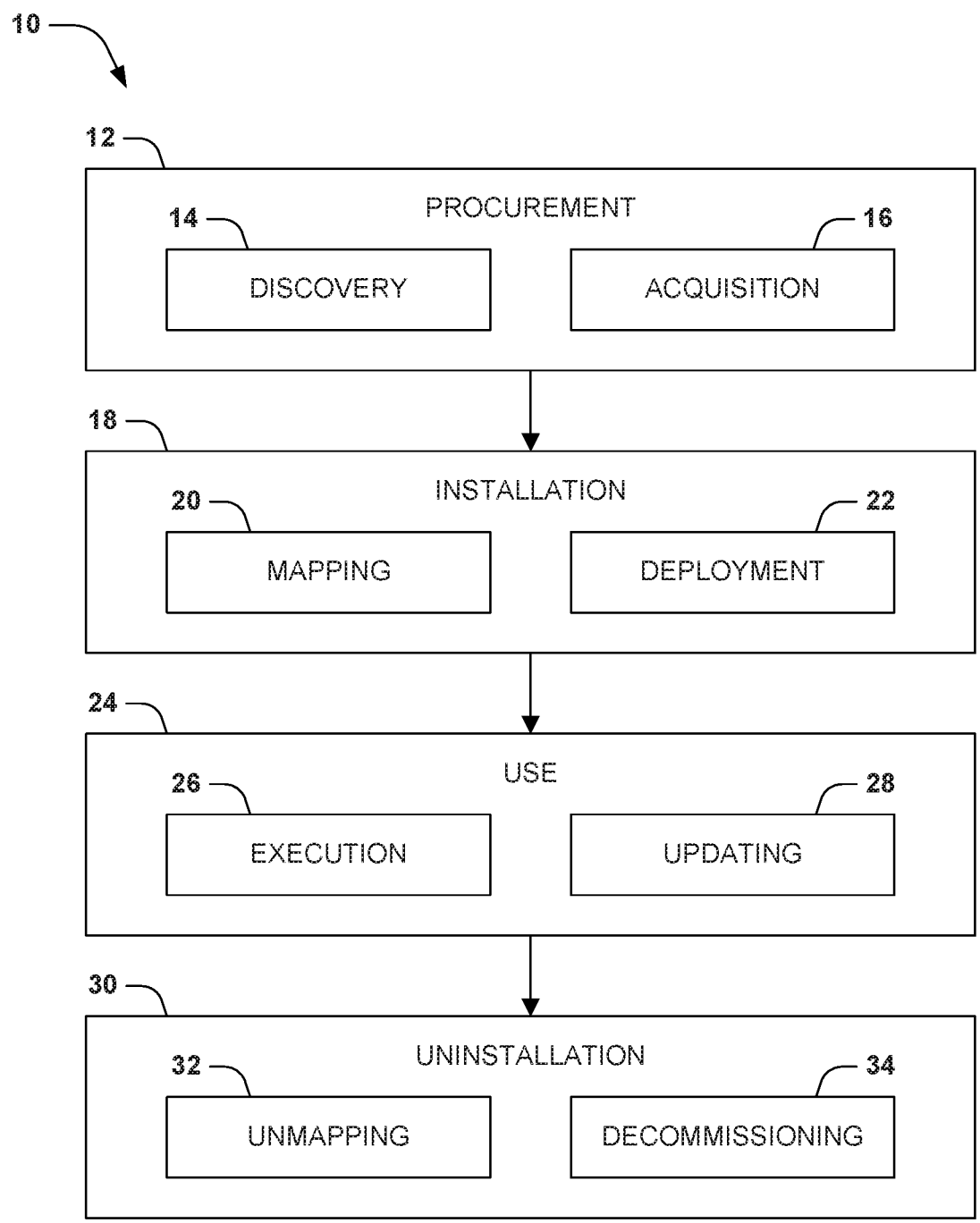
FIG. 1 is an illustration of a typical application life cycle within a computing environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A conventional computing environment typically includes a large and varied array of applications, ranging from small tools with a simple purpose, such as clocks and calculators, to large suites of complex and interrelated applications, such as software integrated development environments and productivity suites. Applications may also comprise media, such as a multimedia player and the media objects rendered thereby (e.g., one or more electronic books to be rendered by a reader application), games, screen savers, device drivers for managing various types of hardware, etc. Applications may be deployed locally (e.g., through executable binaries and resources deployed to the user's device), remotely (e.g., web applications that run on a remote server and communicate with a user through a web browser), or a combination thereof (e.g., locally installed applications that utilize remote resources, such as email clients configured to access network-accessible email archives.) An operating system is usually provided to host and maintain the applications and to provide user access to the applications through an application launcher and associations with data objects related thereto.

FIG. 1 illustrates a typical application life cycle 10 exhibited by an application in a computing environment. The application life cycle 10 performed within a typical computing environment may involve a significant number of operations, such as copying data objects, writing and reading configuration information, and requesting and receiving objects from servers over a computer network. The application life cycle 10 usually begins with procurement 12, wherein the user selects the application to be made accessible in the computing environment. Procurement 12 typically includes discovery 14, wherein the user becomes aware of the application, such as through user-driven browsing of an application library or an advertising suggestion. Procurement 12 also typically includes acquisition 16, wherein the user obtains the resources of the application and arranges permission to use the application. For locally installed applications, acquisition 16 may involve downloading an installer application from an application server; whereas web-accessible applications may involve signing up with the provider of the web application, such as by creating a user account for a webmail service. Acquisition 16 may also involve a transaction, such as a payment of money, and licensing, such as presenting an end-user license agreement (EULA) to a user and soliciting an acceptance of the terms and conditions thereof. Part or all of procurement 12 may sometimes be omitted, such as through preinstalled applications made available to a user as default components of a new computing environment.

After or concurrent with procurement 12, the application life cycle 10 often involves installation 18, wherein the local computing environment is configured to provide access to the program. Installation 18 sometimes involves mapping 20, wherein a particular device is configured to use the application. Mapping 20 may involve a user designation of a particular device for accessing the software (e.g., selecting a cellphone device on which an application is to be deployed), and/or authorization of a device for using the software (e.g., through product activation.) Installation 18 also involves deployment 22, wherein the resources comprising the application are deployed on one or more mapped device (e.g., creating application folders, placing application binaries in such folders, registering code libraries, and writing configuration information to system registries and configuration files.) Deployment 22 may also involve configuring the computing environment to provide access to the application, such as by registering the application with an application launcher, associating the application with data objects related thereto (e.g., identifying a media application as a media player for certain types of media objects), and/or configuring the computing environment to launch the application spontaneously upon system initialization or in response to particular events. Deployment 22 may also involve displaying documentation to assist the user in using the application. In some scenarios, installation 18 may involve the configuration of remote resources, such as registering a device with a network server or configuring a network server to host the application for the device. In other scenarios, installation 18 may be reduced or omitted; e.g., a locally deployed application may comprise an executable binary that runs without configuration or installation, and a web application may not involve any type of installation on a local device.

After procurement 12 and installation 18, the application may be ready for use 24 by one or more users. Use 24 typically involves execution 26, which may begin, e.g., by launching the application or activating a data object associated with the application. Execution 26 may also include the acquisition of additional content, such as new media objects that may be rendered by a media player. Use 24 also involves updating 28, which includes ongoing changes to the application, such as patching to provide new versions of the application or the maintenance of resources utilized thereby (e.g., an antivirus package that receives and incorporates information for detecting and addressing new forms of malware.) Such updating 28 may sometimes be performed on remote resources by an application server; e.g., a webmail provider may update its back-end software frequently without involving the user or user devices, and even without the awareness of the user.

The application life cycle 10 may also involve uninstallation 30, wherein the application is removed from one or more devices. Uninstallation 30 may include unmapping 32, wherein one or more devices are deauthorized for use of the application. For instance, a web application may be accessible only on certain devices, and a device may be unmapped by removing it from the authorized devices list stored on the application server. Uninstallation 30 may also include decommissioning 34, wherein the resources of an application may be removed from one or more devices. Decommissioning 34 may be requested by the user, or may be spontaneously invoked (e.g., an application may be licensed to the user only for a limited duration, and the computing environment may be configured to decommission the application automatically upon expiration of the license term.)

Although the application life cycle has been widely utilized for a large variety of applications, many conventional computing environments are configured such that the application life cycle exhibits several disadvantages. As one example, convention computing environments may entail a significant amount of user participation in conducting this application life cycle. During procurement 12, a computing environment may provide little or no support for discovering or acquiring applications, and a user may be tasked with finding useful applications through research (e.g., web searches) and downloading application installation packages. Procurement 12 may also involve user acceptance of a license, but this may sometimes be abrogated (e.g., a user may preauthorize any application offered under a particular boilerplate end-user license agreement.) Modern computing environments typically provide little or no support for mapping 20, and users may have to arrange for individual deployment of an application on an array of devices. Many conventional computing environments provide some support for deployment 22, such as automated installer tool. However, such installer tools may still delegate to the user a considerable amount of interaction that may be otherwise avoidable, such as inputting user information (name, email address, etc.) while creating a user account in a web application, providing credit card information to purchase a license, and inputting a serial key included with physical media, such as an installation CD. Conventional computing environments may also provide inadequate support for updating 28, which is often delegated to applications, or even to the user-initiated discovery, downloading, and application of software patches. Finally, unmapping 34 and decommissioning 34 may be facilitated by the installer app, but may be limited to per-device management; e.g., the user may have to initiate uninstallation on each device, and centrally managed deployment among all such devices may be difficult.

These disadvantages may be exacerbated and other disadvantages may arise in the context of modern computing environment use, which is often extended across an array of devices. A user of a computing environment may cooperatively manage and utilize a workstation, a portable computer system such as a notebook or tablet, a game console, a cellphone, and a media player. Moreover, the user may wish to access all or part of the computing environment on a public workstation, or to grant access to part or all of the computing environment to other users (e.g., to allow a guest to utilize the computing environment or to access data objects managed therein.) Despite the continued proliferation of devices that a user may operate in the context of a computing environment, conventional operating systems may provide little support for the consistent presentation of a computing environment among such devices, and for promoting the distribution, access, and synchronization of data objects thereby. This limited support is particularly apparent with regard to applications. In general, users often perform many aspects of the application life cycle 10 manually on each device, independently of the configuration of any other device. For instance, a user may configure a particular application according to the user's preferences, but configuring each device on which the application in a similar manner often involves a manual configuration of each application deployment. In addition, the use of multiple devices in a cooperative manner may create new problems; e.g., a user may have a set of contact information for a person on a first device that is inconsistent with a set of contact information for the same person on a second device, and may be unable to ascertain which set of contact information is more current.

Recent attempts have been made to develop techniques for providing access to a computing environment among an array of devices in a consistent, deployable, and extensible manner. These techniques also seek to provide a common set of applications among the cooperating devices, and a centralized service for managing the procuring, installing, using, and uninstalling of applications among such devices. The application set is not necessarily identical among various devices; e.g., a workstation may contain high-performance applications (e.g., photo editing software and graphically intensive games) that may not run well on a cellphone device, and the cellphone device may include portability applications (e.g., a GPS-based mapping software) that is not relevant to a non-portable workstation. However, many applications and data objects related thereto may be shared among such devices (e.g., a calendar application configured to manage a user calendar object), and the computing environment may be adapted to enable the distribution and synchronization of the application and data objects among such devices. The application may also be adapted for each such device; e.g., a first version or configuration of the application may be oriented to high-performance devices such as a workstation, while a second version or configuration of the application may be oriented to low-performance devices with limited screen size and input capabilities. However, other portions of the application configuration (e.g., user preferences, such as a visual style) of the same application may be shared among the devices, and may promote the consistency of the user experience with the computing environment among the various devices.

It may therefore be appreciated that a computer system may be advantageously represented in a manner that enables the deployment of the computing environment, including the application set, among a set of devices. In one such technique, the computing environment—including a set of applications, the application resources, and data objects used thereby—is represented in a manner that may be delivered to devices for rendering according to the capabilities of the device. The representation comprises a set of objects organized according to an object hierarchy and represented according to a common grammar. The objects include the data objects of the computer system, such as the user files and data created by the user. The objects also include the executable binaries and class libraries comprising the operating system components, such as the shell, and the applications offered therein. The object also include the information specifying the user interface of a computing environment, including shell preferences (e.g., visual themes, application launch menu, and double-click threshold), user accounts and privileges, security information (e.g., passwords, security tokens, and certificates), application binaries and configuration information, user data and metadata (e.g., file sharing information), and data caches (e.g., most-recently-used file lists and browser history.) Despite the various nature and uses of these objects, the objects are represented in a common manner in the object hierarchy, and may be arbitrarily organized in the hierarchy. Thus, in contrast with conventional computer systems comprising a set of isolated data stores, each containing one type of object (e.g., a file system containing files, a registry containing configuration information, and a data cache containing the browser history), the object hierarchy in this approach organizes all such objects in a common manner in the object hierarchy.

A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered. Also, the devices sharing the computing environment may be integrated through the shared information set, such that one device may interact with others that are identified in the information set; e.g., data stored on a first device may be accessed by a second device, and a first device may be controlled by a second device through a communications conduit. The information set may therefore identify the collection of devices that share the computing environment, along with the roles, capabilities, and resources of each device, to provide an integrated computing experience across a potentially large number and variety of devices.

Figure 2:
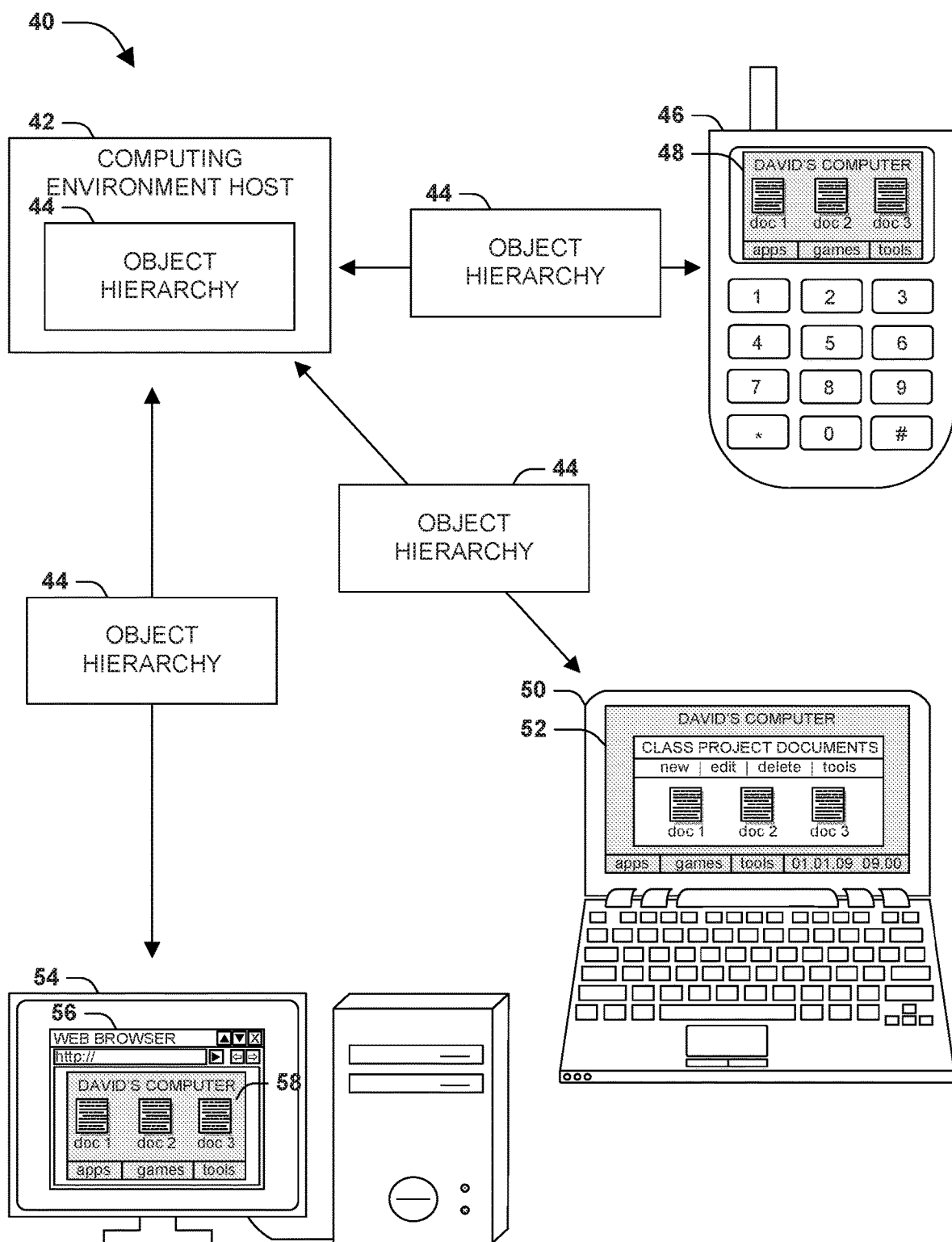
FIG. 2 is an illustration of an exemplary interaction of a computing environment host with various computing environment rendering devices.

FIG. 2 illustrates one such scenario 40, wherein the computing environment may be hosted by a computing environment host 42, which may store and manage an object hierarchy 44. The computing environment host 42 may also render the object hierarchy 44 in different ways on behalf of various devices, such as a cellphone device 46, a personal notebook computer 50, and a public workstation 54, and also on behalf of different types of users having different access privileges. The rendering of the computing environment therefore reflects a consistent computing environment across all devices that expose the same applications, user profiles, shell configuration, user data objects, etc. Thus, a user may access a full-featured version 52 of the computing environment through a high-performance notebook computer, a stripped-down version 48 of the computing environment on a low-power cellphone device 46, and a browser-compatible and privacy-oriented version 58 of the computing environment through a web browser 46 of a public terminal 54. To the extent that the capabilities of each such device support the rendering of the computing environment, a consistent user interface and data set may be presented due to the rendering of the object hierarchy 44 adjusted to the capabilities of each device. Updates to the computing environment may be propagated back to the computing environment host 42, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Specifically with respect to the applications of the computing environment, the object hierarchy 44 may include a representation of the application set, the application resources, and the data objects created thereby. Moreover, the computing environment host 42 may apply services to the various objects comprising the object hierarchy 44, and the common format in which the objects are stored in the object hierarchy may facilitate consistent availability and application of the services regardless of the nature of the objects applied thereto.

In furtherance of these ends, an object hierarchy schema may be devised for organizing the objects of the object hierarchy in a particular manner. For instance, objects may be devised and structured to represent data objects (such as files), users and user accounts, devices, and events arising with the computing environment, as well as derivation, ownership, and interrelationships therebetween. The manner of organizing the objects may give rise to particular advantages and/or reduce disadvantages with respect to other organizations of the objects. Accordingly, the object hierarchy schema according to which the objects may be organized is devised in view of the uses of such objects and of the computing environment. For instance, security permissions may be modeled by associating respective objects with one or more user accounts having various sets of permissions (e.g., a first user account having read/write permissions to an object, a second user account having read-only permissions to the object, and a third user account having no permissions to the object.) The computing environment may be configured to utilize the objects of an object hierarchy according to the structure and semantics of the object hierarchy schema, thereby enabling the presentation of a deployable computing environment across a plurality of devices in a manner that is appropriate for the configuration and capabilities of each device, but otherwise consistent among all such devices.

Within an object hierarchy of this nature, a set of applications may be managed in a manner consistent with the application life cycle of each application. For instance, the computing environment host 42 may facilitate the acquisition of the application, the association of the application with one or more devices, and the deployment of the application on each device. The representation of the application as a set of objects in the object hierarchy 44 may facilitate common application management tasks. As a first example, the application may be readily deployed, and in many scenarios automatically deployed, on a plurality of computer systems and devices that are represented in the object hierarchy 44. For instance, a first version of the application may be deployed to a personal notebook computer 50; a second version of the application may be deployed as a web or web-enabled application for use with a public workstation 54; and a third version of the application may be deployed as a reduced-functionality application for use on a low-powered cellphone device 46. As a second example, the computing environment host 42 may facilitate the updating of an application (e.g., patching of application resources with updated versions, or deployment of new content for use with the application) by accordingly adjusting the object hierarchy 44 and deploying the adjustments to the devices by synchronizing the hosted and deployed versions of the object hierarchy 44.

The representation of an application set as a set of objects in a deployable object hierarchy 44 may also enable new features. As a first example, the computing environment may enable a user to share an application with a second user, or an aspect of an application session, by deploying a specific portion of the object hierarchy 44 to the second user's device, computer system, or computing environment host 42. For instance, a first user may choose a set of song objects to play on a first computer through a media player application, and may choose to share the media player application session with a second user (e.g., by streaming the audio of the media player application to the second user.) As a second example, the configuration of the application may be synchronized across devices and computer systems as part of the object hierarchy. Device-independent application properties (e.g., custom words added to a spell-check dictionary) may be automatically propagated to all such devices and computer systems, while device-specific application properties may be specified for respective devices by the computing environment host 42. In this manner, the application management service of the computing environment host 42 may support the discovery, deployment, use, and removal of applications on various computer systems and devices operated by one or more user. Many portions of these tasks may be performed by adjusting the object hierarchy 44 and synchronizing its deployment to the various devices represented therein, which, as an automated process, may provide a significant improvement in the consistency of the computing environment and the overall user experience.

Figure 3:
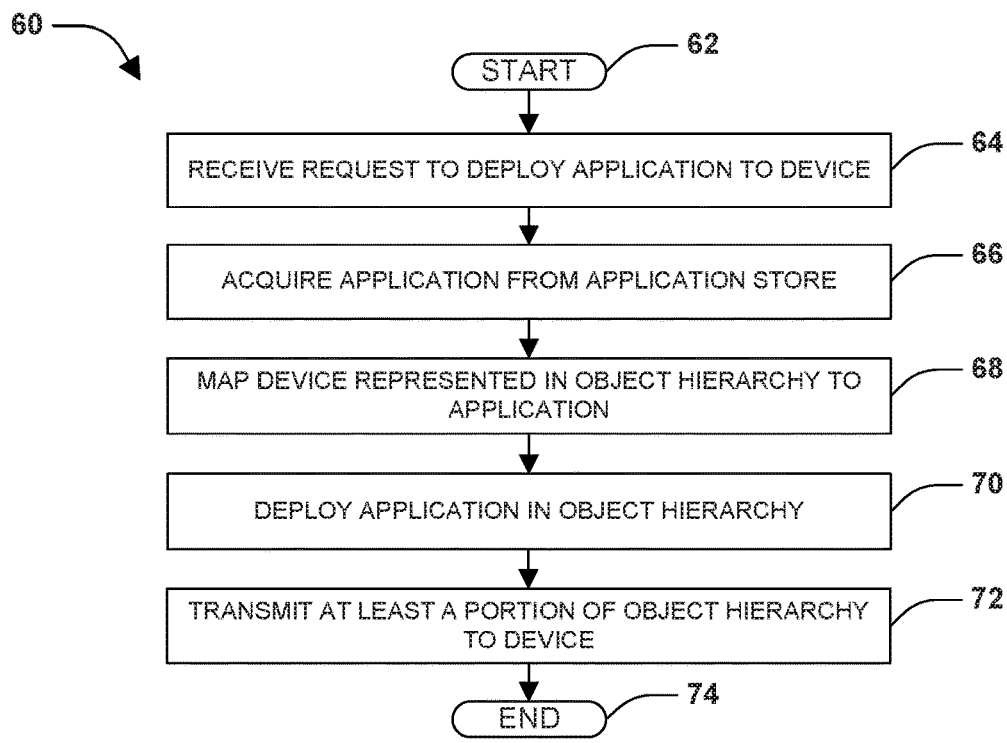
FIG. 3 is a flow diagram illustrating an exemplary method of managing a deployment of an application in an object hierarchy representing a computing environment upon a device.

FIG. 3 illustrates one embodiment of these techniques as an exemplary method 60 of managing a deployment of an application stored in an application store to an object hierarchy representing a computing environment upon a device. With reference to FIG. 2, this exemplary method 60 may be utilized to install and manage an application on one or more devices, such as a cellphone device 40, a notebook computer 50, and a public workstation 54, by representing the application in a deployable object hierarchy 44 that is (at least partially) distributed to the devices. The exemplary method 60 begins at 62 and involves receiving 64 a request to deploy the application to the device. The request may be generated by a user of the computing environment who wishes to install the application, by a program running in a representation of the computing environment on a device, by a program configured to generate a new computing environment having at least one preinstalled application, etc. The exemplary method 60 also involves acquiring 66 the application from the application store. If the application is a web application, the acquiring 66 may simply involve (e.g.) verifying the availability of the application at a provided URL. The exemplary method 60 also involves mapping 68 the device represented in the object hierarchy to the application. The mapping 68 may involve associating the representation of the device within the object hierarchy to the representation of the application within the object hierarchy, creating a set of configuration information in the object hierarchy for the application with respect to the device, etc.

The exemplary method 60 of FIG. 3 also involves deploying 70 the application in the object hierarchy. The deploying 70 may involve creating a representation of the application within the object hierarchy, representing one or more executable binaries in the application representation of the object hierarchy, further configuring the application with respect to the device, etc. For web applications, the deploying 70 may comprise, e.g., inserting a link to the website in an application launcher representation associated with the device, and/or creating one or more cookies on the device to facilitate the persistence of the web application between sessions. The exemplary method 60 also involves transmitting 72 at least a portion of the object hierarchy to the device. For instance, a high-performance computer system, such as a notebook computer 50, may receive a full version of the object hierarchy, while a comparatively low-powered cellphone device 46 may receive only the portion of the object hierarchy that is relevant to the cellphone device 46, including a deployment of the new application that is compatible with the cellphone device 46. Having configured the object hierarchy to associate the application with the device and having deployed the object hierarchy to the device, the exemplary method 60 therefore achieves the management of a deployed application with respect to the device, and so ends at 74.

Figure 4:
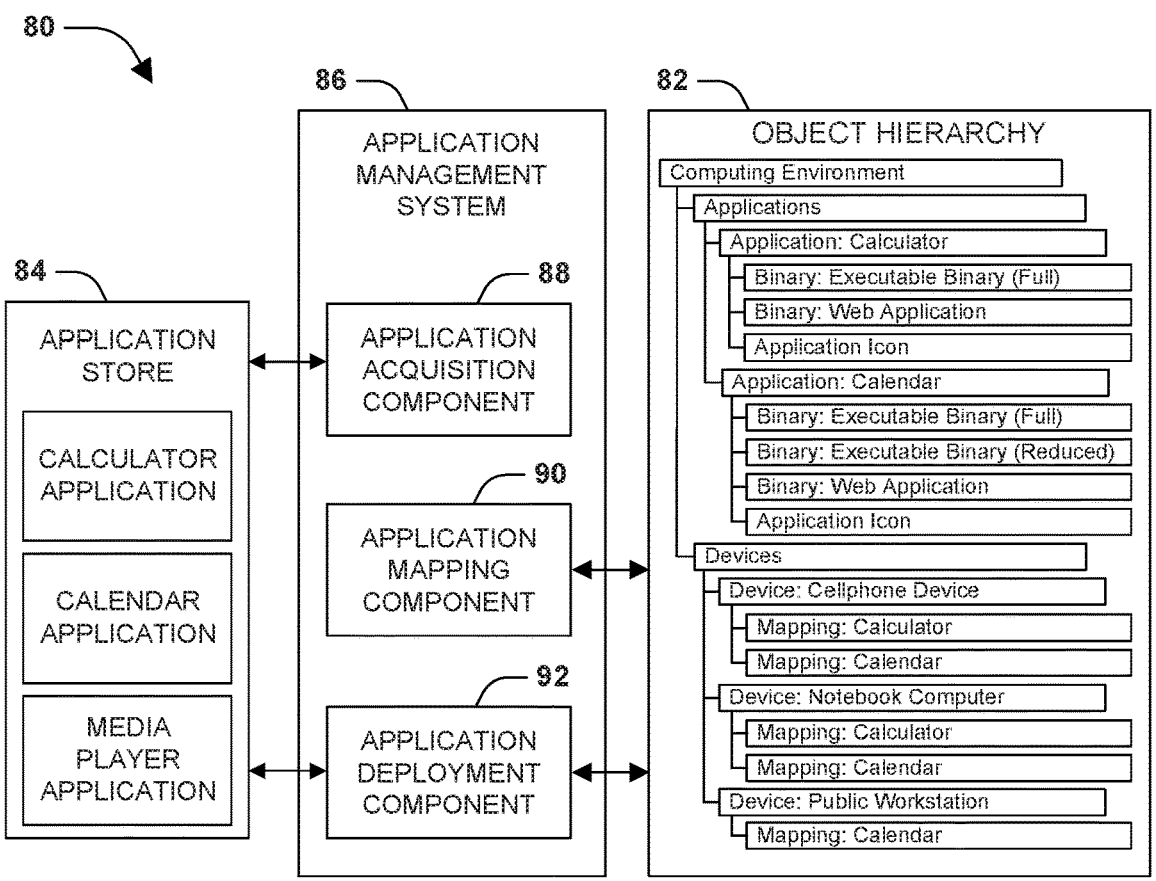
FIG. 4 is a component block diagram illustrating an exemplary system for managing the deployment of at least one application managed by an application store to an object hierarchy representing a computing environment upon at least one device.

FIG. 4 presents a second embodiment of these techniques, embodied as an exemplary system 86 for managing the deployment of applications stored in an application store 84 to an object hierarchy 82 representing a computing environment upon at least one device. This scenario 80 involves three deployable applications: a calculator application, a calendar application, and a media player application. These applications may be made available within a computing environment represented upon three devices: a cellphone device, a notebook computer device, and a public workstation. Within this scenario 80, the applications are hosted by an application store 86 that represents at least one application. These applications may be deployed within the computing environment and upon the devices upon which the computing environment may be rendered by reconfiguring the object hierarchy 82.

Within this scenario 80, the application management system 86 may operate to achieve the deployment of one or more applications within the object hierarchy. The exemplary system 86 comprises an application acquisition component 88, which is configured to receive a request to install an application, and to acquire the application from the application store 84. The application acquisition component 88 may also determine whether the request satisfies any prerequisites (e.g., whether the application can run on the requested device; whether the user is permitted to install and run the application, in view of various security privileges of the user and licensing issues; etc.) The exemplary system 86 of FIG. 4 also includes an application mapping component 90, which is configured to map at least one device represented in the object hierarchy 82 to at least one installed application. For instance, if the calculator application is already included in the object hierarchy 82, the application mapping component 90 may create an association within the object hierarchy 82 between the calculator application and one or more devices upon which the application is to be provided.) If the calculator application is not already included in the object hierarchy 82, the exemplary system 86 may also create a representation of the calculator application in the object hierarchy 82 before performing the mapping, e.g., by copying representations of the executable binaries or links to a web application website into the object hierarchy 82.) The exemplary system 86 also includes an application deployment component 92 configured to deploy the at least one installed application in the object hierarchy 82. The deployment may involve, e.g., creating device-specific configuration information within the object hierarchy for the newly mapped devices; associating the newly mapped device with device-independent configuration information; inserting the application in an application launcher to be rendered on one or more devices; etc. Having associated a representation of the device in the object hierarchy 82 with a representation of the application set represented in the computing environment rendered by the device, the exemplary system 86 thereby achieves the management of deployed applications in the object hierarchy representing the computing environment.

The techniques described herein may be implemented with variations in many aspects, and some variations may present additional advantages and/or reduce disadvantages with respect to other variations of these and other techniques. These variations may be included in various embodiments, such as the exemplary method 60 of FIG. 3 and the exemplary system 86 of FIG. 4, and may be compatible with other such variations to present several such additional advantages and/or reduced disadvantages. Those of ordinary skill in the art may therefore devise many such embodiments in accordance with the techniques discussed herein.

A first aspect that may vary among implementations of these techniques relates to the architecture of the application management server through which the application management service is provided. As illustrated in FIG. 4, the application management system 84 may interact with an application store 82 having various applications, may request and receive an application stored therein, and may deploy the application to the object hierarchy 82. In this scenario 80, the application management system 84 is embodied as a standalone interface among one or more application stores and the computing environment host 86. However, other architectures and system factorings may also be suitable for implementing these techniques.

Figure 5:
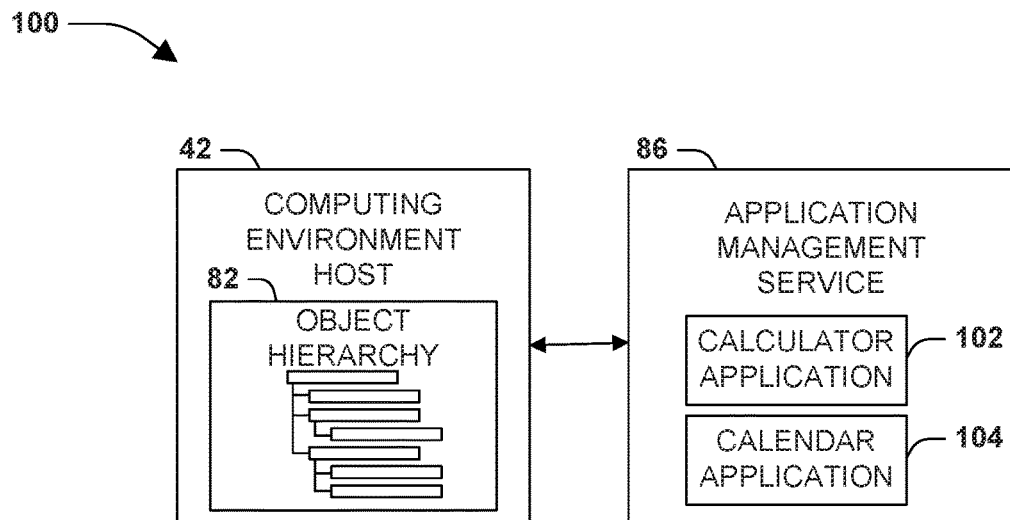
FIG. 5 is a component block diagram illustrating another exemplary system for managing the deployment of applications to an object hierarchy representing a computing environment upon at least one device.

FIG. 5 illustrates a second exemplary architecture 100, wherein the application management service 86 also serves as the application store 84, and therefore contains various applications, such as a calculator application 102 and a calendar application 104, that may be deployed to the object hierarchy 82. This embodiment may present an advantage of a tighter integration of the application acquisition service with the applications that are available for deployment.

Figure 6:
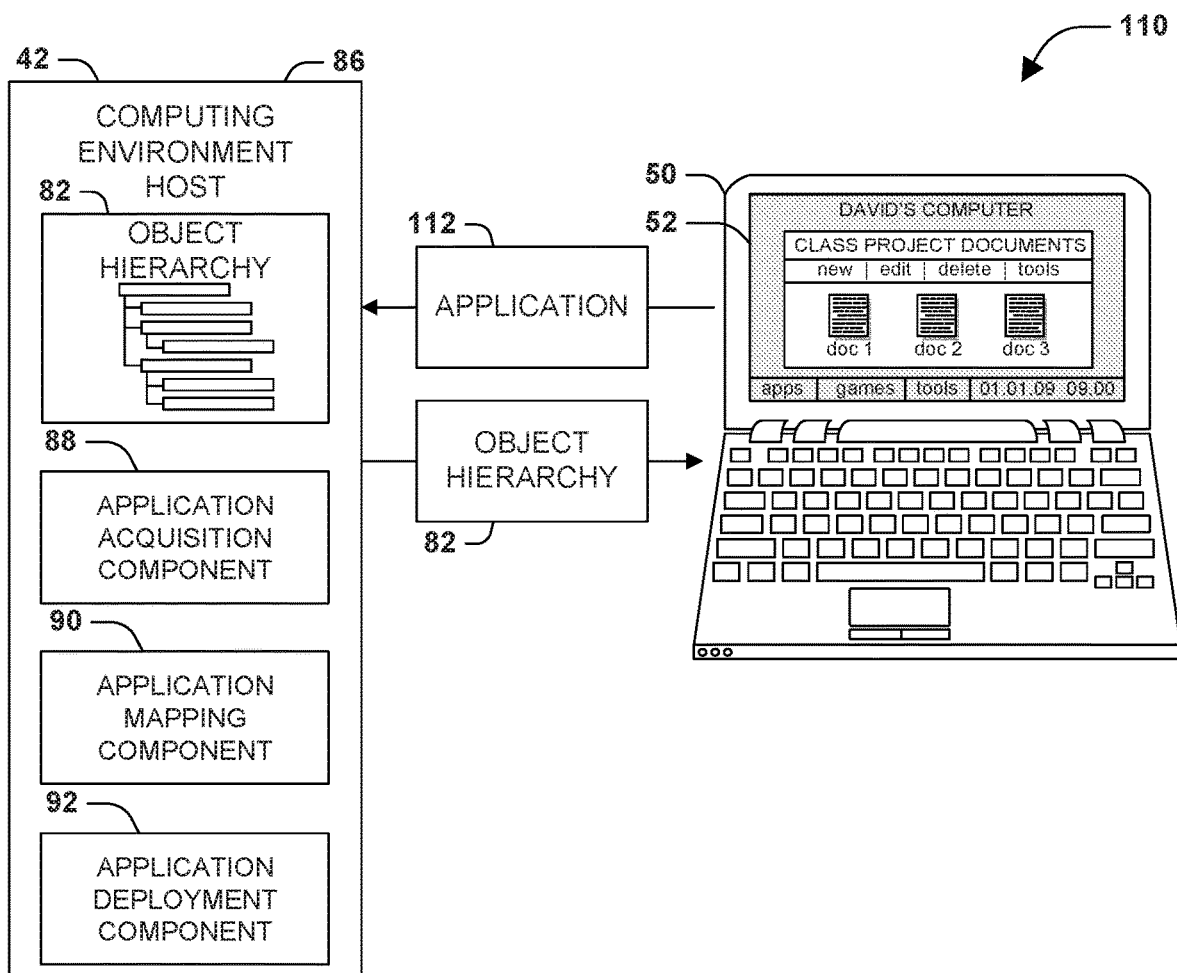
FIG. 6 is a component block diagram illustrating yet another exemplary system for managing the deployment of applications to an object hierarchy representing a computing environment upon at least one device.

FIG. 6 illustrates a third exemplary architecture 110, wherein the computing environment host 42 incorporates the application management service 86. The computing environment host 42 may therefore store both the object hierarchy 82 and the services of the application management service 86, such as the application acquisition component 88, the application mapping component 90, and the application deployment component 92. In this third exemplary architecture 110, the application 112 may be directly received from a device, such as through a request initiated by the user within the computing environment represented on the device. The computing environment host 42 may receive this request and process it through the components of the application management service 86, which may update the object hierarchy 82 stored in the computing environment host 42. The updated object hierarchy 82 may then be synchronized with the device to complete the deployment of the application to the device. These and other system factorings may be devised by those of ordinary skill in the art while implementing the techniques discussed herein.

A second aspect that may vary among implementations of these techniques relates to variations in the basic components of the application management, including acquisition, mapping, and deployment. As a first variation of this aspect, the acquiring application typically entails receiving a request to deploy the application and acquiring the application to be deployed to the object hierarchy with respect to a particular device. However, the acquiring may also include presenting an application license to a user through the device, such as displaying the terms and conditions of an end-user license agreement for the application. The acquiring may also include requesting the user to accept the application license as a prerequisite of deployment; and upon receiving an acceptance of the application license, the acquiring may include recording the acceptance of the application license, such as by notifying an application license server. This acceptance might be received as an acknowledgment from the user, or as an automated acceptance, e.g., where the user has preauthorized the acceptance of any application under a particular application license (e.g., any application provided under a particular version of the GNU Public License.) The acquiring may also include brokering an acquisition transaction with a user of the at least one device, such as an e-commerce purchase of a license to the application. The acquiring may also include generating a user account representing a user of the application, which may be particularly advantageous for acquiring access to a web application, such as a webmail application that is entirely hosted on a webmail server and provided through a browser in the computing environment.

As a second variation of this second aspect, the mapping of an application typically involves associating the application with one or more devices represented in the object hierarchy. However, the mapping may also include an examination of device-specific conditions, such as whether the application is available in a version that is compatible with the device, and whether the application or a variant thereof (such as an earlier version) is already available on the device. The mapping may also involve acquiring additional resources in order to promote the mapping of the application to a new device, such as a new version of the application binary that may be compatible with the device, or additional components on which the application depends that may be deployed to the device (e.g., a supporting runtime that may be retrieved from another server.) The mapping may also involve an activation of the application through an application activation server, which may authorize the execution of the application on a particular device, such as by providing an authenticated certificate that is validated by the application on the device upon launching.

As a third variation of this second aspect, the deploying of an application typically involves deploying the application within the object hierarchy, such as by inserting a representation of the components of the application in the object hierarchy. Even typically organized applications may be structured in numerous ways. A small utility may comprise a single executable binary, which may be wholly or partially compiled, or may be included as source code that is compiled locally on each device. This executable binary may be represented, e.g., as source code module, a parse tree, intermediate language instructions representing a partially compiled binary, a wholly compiled binary, etc. A larger utility might comprise a set of resources, such as one or more executable binaries; shared assemblies that may be registered in a global assembly cache; application resources such as icons, sound objects, pictures, documents, and video; help files; data resources stored in one or more structured data stores, such as a relational database; ancillary application resources, such as a language dictionary file for a spell-checking tool in a word processing application; an application manifest that serves as an index of the resources specified therein; etc. Moreover, an application may include several versions of an executable binary, each of which may be targeted to a particular platform; for instance, an application might include a full-featured version for use on a more powerful device such as a notebook computer 50 and a reduced functionality version for use on a low-powered cellphone device 46. The application may also include several sets of configuration information, each targeting a specific platform. The application may be presented as a standalone installer package, or as an installable archive that may be deployed by a device-based installer, or as a set of one or more resources that may be utilized in any location, etc.

The object hierarchy may also include applications of a less conventional structure. For example, a game application might include a large number of graphics resources, such as bitmap textures and meshes for constructing complex three-dimensional environments and objects represented therein. A web-enabled application may include a set of web pages, which may contain portions of inline code or may reference external code resources, such as Java objects included in source code or compiled form. Such an application might also be represented simply as a reference to a website where such resources are available. A web-enabled application might also be structured through a markup language, such as the Extensible Application Markup Language (XAML), which may be compiled or interpretively executed on a device either as an application or an applet hosted in a web browser. Finally, a web application might be represented simply as one or more URLs referencing one or more websites on which part or all of the application is deployed, which may be accessed on the device through a web browser; alternatively or additionally, some resources may be included for device deployment, such as cookies that may locally stored to persist the state of a web application between sessions.

Because the resources comprising an application may be diverse, the deployment of the application in the object hierarchy may be similarly robust. For example, text resources may be included as plaintext, or may be compressed with a general or special-purpose compression utility. Binary resources may be presented as serialized binary code, may be compressed with a binary compression utility, may be transcoded (e.g., via Uuencode or MIME), etc. Hierarchically organized objects may be structured according to a hierarchical formatting, such as XML, or may be serialized as a single hierarchical object. Large objects may be included as atomic units, compressed, transcoded (e.g., a movie file may be reencoded at a lower bitrate to conserve space), segmented into portions that may be individually transmitted to a device over time or on an ad hoc basis, etc. Resources may be included in the object hierarchy, or may be inserted as a reference to a server hosting the resource that may be accessed as needed. Large sets of numerous objects may be included as an archive (e.g., a compressed file containing several thousand objects.) Web-based applications may be represented as one or more URLs where the components of the application are available; alternatively or additionally, a snapshot of the web application may be captured and included in the object hierarchy to provide a cached version of the application or to enable offline access to the application. Those of ordinary skill in the art may be able to devise many techniques for representing an application in an object hierarchy while implementing the techniques discussed herein.

Figure 7:
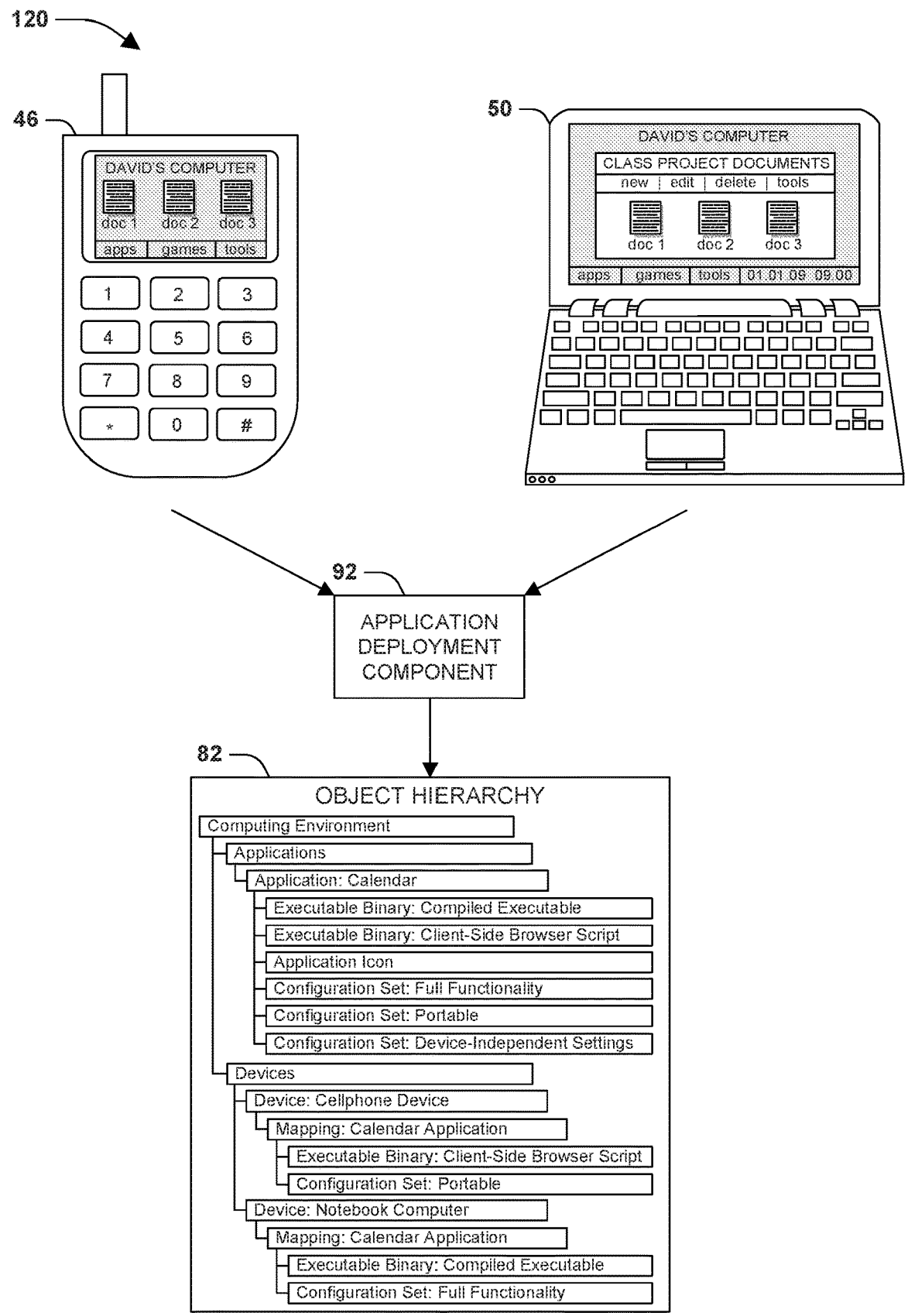
FIG. 7 is a component block diagram illustrating a portion of an exemplary system for managing the deployment of applications to an object hierarchy representing a computing environment upon at least one device.

In addition to representing the application in the object hierarchy, the deploying may also include configuring the application with respect to the device and/or with respect to the user. For instance, a new set of configuration information may be formulated for the device, or an appropriate set of configuration information in a library of configuration sets may be designated for use by the device. FIG. 7 illustrates one such scenario 120, wherein the object hierarchy 82 includes a representation of a calendar application comprising two executable binaries (one compiled executable for local native execution, and one client-side browser script for slower but more standardized access through a standard web browser) and two configuration sets (a full functionality configuration set for high-performance devices and a portable configuration set for low-power mobile devices.) The object hierarchy 82 also includes a configuration set comprising device-independent settings for use with any device, such as a preferred color scheme selected by the user. The object hierarchy 82 also contains representations of two devices on which the computing environment may be rendered: a low-power cellphone device 46 and a high-performance notebook computer 50.

In deploying the application within the object hierarchy 82 for these devices, the application deployment component 92 may configure the application for particular use on each device. For instance, the calendar application may be deployed for the cellphone device 46 by associating it with the client-side browser script executable binary, which may run within a web browser application of the cellphone device 46, and with the portable configuration set for low-power devices. Similarly, the calendar application may be deployed for the notebook computer 50 by associating it with the compiled executable binary, and with the full functionality configuration set that may provide computationally intensive features that the notebook computer 50 is capable of rendering. However, both devices may incorporate the device-independent configuration set to present a consistent set of device-independent features, thereby promoting a consistent computing environment among all such devices of the computing mesh. Those of ordinary skill in the art may be able to devise additional variations in the acquisition, mapping, and deployment of applications in the object hierarchy 82 while implementing the techniques discussed herein.

A third aspect that may vary among implementations of these techniques relates to additional features that may be added to the basic components of such embodiments. In addition to the basic management services (acquisition, mapping, and deployment), additional services may be provided for application management, which may facilitate the user and the computer system in the management of the application life cycle.

As a first variation of this third aspect, the application management service may also serve as the computing environment host, such as illustrated in the third exemplary architecture 110 of FIG. 6. In this first variation, the application management service also comprises an object hierarchy store that is configured to store the object hierarchy, and an object hierarchy transmission component that is configured to transmit at least a portion of the object hierarchy to the devices (e.g., by synchronizing the updated object hierarchy with the object hierarchy stored on each device.) The transmission of the portion of the object hierarchy comprising the deployed application to the device may achieve the installation and deployment of the application to the device.

As a second variation of this third aspect, the application management service may also facilitate the discovery of applications that may be of interest to the user. For instance, a method of managing the deployment of applications to an object hierarchy (such as the exemplary method 60 of FIG. 3) may include a querying aspect, wherein the method is configured, upon receiving an application query from a user, to select applications satisfying the application query, and to present the selected applications to the user. Similarly, a system for managing the deployment of applications to an object hierarchy (such as the exemplary system 86 of FIG. 4) may include an application discovery component, which may be configured to receive from a user an application query, select applications satisfying the application query, and present selected applications to the user. The user may then choose to acquire one or more of the selected applications, which the application management system may deploy to the object hierarchy.

Figure 8:
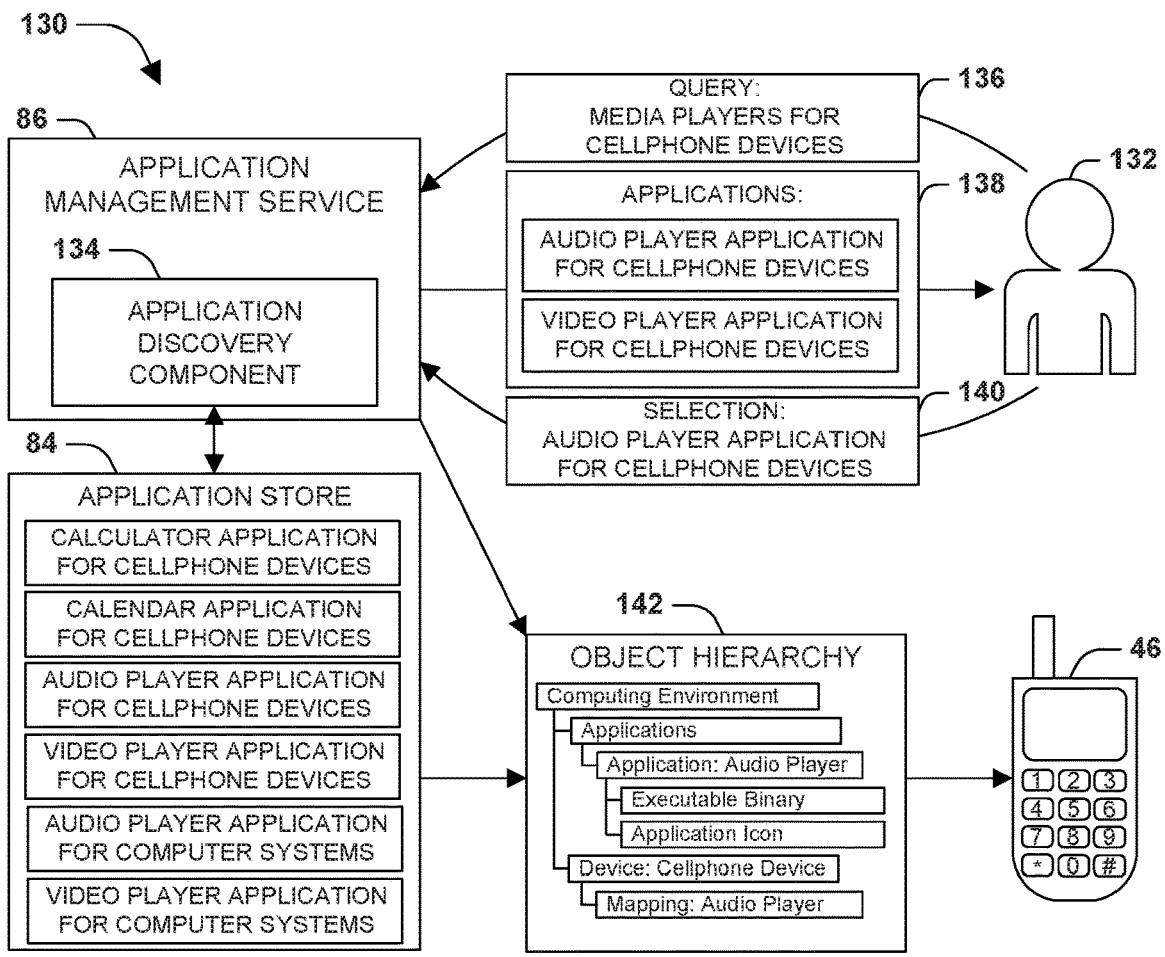
FIG. 8 is a component block diagram illustrating another portion of an exemplary system for managing the deployment of applications to an object hierarchy representing a computing environment upon at least one device.

FIG. 8 illustrates one such scenario 130, wherein a user 132 wishes to identify an audio player application that may be compatible with the user's cellphone device 46. The user 132 may therefore issue an application query 136 to an application discovery component 134 of the application management service 86, such as a query for media player applications that are compatible with cellphone devices. The application discovery component 134 may communicate with an application store 84 to identify applications satisfying the application query 136, such as an audio player application for cellphone devices and a video player application for cellphone devices. The application discovery component 134 may therefore provide a response 138 presenting the applications to the user 132. The user 132 may reply to the application management service 86 with a selection 140 of one or more of the discovered applications to be deployed to the cellphone device 46. The application management service 86 may then acquire the selected application (in this scenario 130, the audio player application for cellphone devices), and may deploy the application to the object hierarchy 142, which may then be transmitted to the cellphone device 46 to complete the deployment of the selected application. Those of ordinary skill in the art may be able to devise other approaches for facilitating the discovery of applications while implementing the techniques discussed herein.

As a third variation of this third aspect, the application management service may also facilitate the launching of the application. For instance, an exemplary system embodying the application management service may include an application launching component, which may be configured to launch the application on the at least one device. The application launching component may comprise, e.g., a runtime configured to provide a platform for the device and to facilitate the execution of the application thereupon. For instance, an application may be deployed in the service as a client-side browser script, and the application management service may include with the object hierarchy a browser runtime within which the browser script may be interpretively executed. As another example, the application may be represented as source code, and the application launching component may comprise a device-specific compiler that, upon launching the application on the device, compiles the source code into an executable binary that may be executed on the device. Moreover, the application launching component may also store the compiled executable binary, such as in an assembly cache, and may respond to subsequent requests to launch the application by fetching the stored executable binary instead of recompiling the application. As a third example, a web-enabled application may comprise a client-side front end configured to access a remote resource, and the application launching component may attempt to connect to the remote resource and to verify its availability to the device upon launching the application. Those of ordinary skill in the art may be able to devise many ways of facilitating application launching on a device while implementing the techniques discussed herein.

As a fourth variation of this third aspect, the application management service may also facilitate the sharing of aspects of the application with other users. Such application sharing may occur in many scenarios. As a first example, the sharing may involve sharing of the full application (including all resources and data objects associated therewith.) As a second example, the sharing may involve sharing a version of the application with another user; e.g., the first user may have purchased a license to use the application, and may share with the second user a reduced functionality version of the application that may demonstrate some features of the application to encourage the second user to license the application. As a third example, the sharing may involve sharing one or more data objects associated with the application, such as media objects created with the application. The second user may then use the same application or another application to render the media objects within the second user's computing environment. As a fourth example, the sharing may involve sharing a configuration of the application with another user; e.g., several members of a software development team may utilize a particular configuration of an integrated development environment while working as a team in the development of the software. As a fifth example, the sharing may involve sharing a session of the application with another user; e.g., two users may collaborate in the preparation of a text document, and a first user may share a session of a word processing application with the second user to promote live interaction between the users. These sharing scenarios may also arise among several users of a computing environment (represented by a single object hierarchy), or among users of two or more computing environments (represented by multiple object hierarchies), or may arise when sharing a portion of an object hierarchy representing a computing environment with users of computing environments represented in unknown manners by providing data objects of the shared computing environment through a common communications protocol, such as the File Transfer Protocol (FTP.) These and other sharing scenarios may be devised by those of ordinary skill in the art while implementing the techniques discussed herein.

Figure 9:
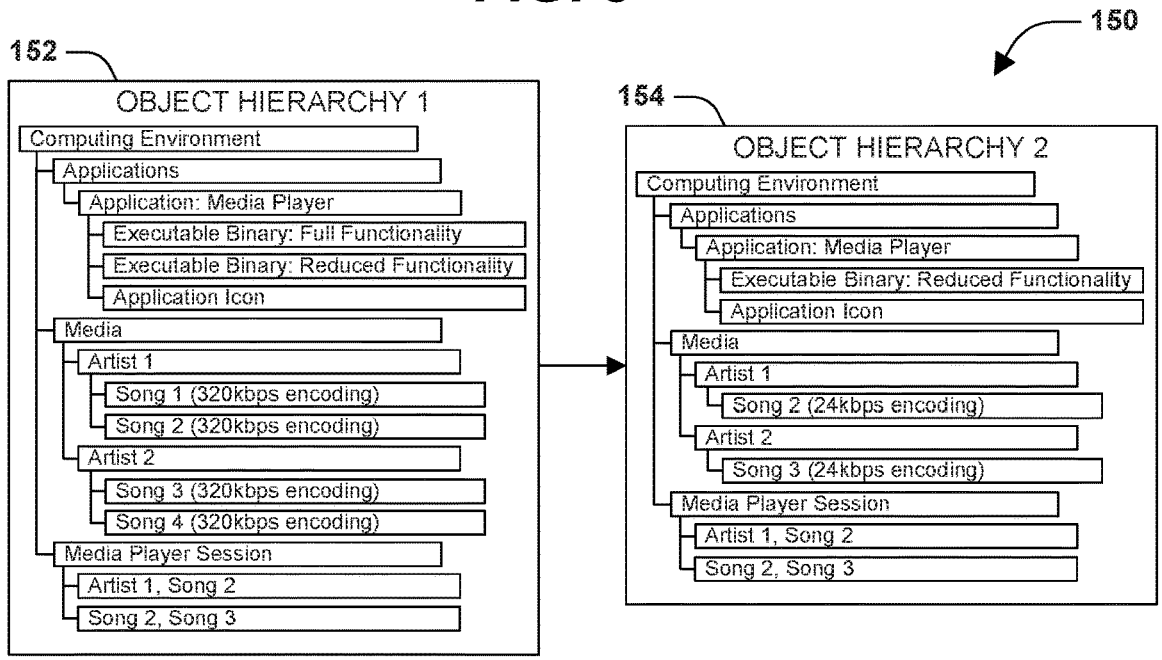
FIG. 9 is a component block diagram illustrating yet another portion of an exemplary system for managing the deployment of applications to an object hierarchy representing a computing environment upon at least one device.

FIG. 9 illustrates an application sharing scenario 150, wherein a first user of a first object hierarchy 152 has acquired a media player application and some media objects, in the form of various songs created by various artists, wherein such media objects are encoded in a high-fidelity manner (i.e., at a 320 kbps encoding rate.) The first user has also created a media player session, such as a podcast, which references a few of the objects represented in the media section of the first object hierarchy 152. The first user may wish to share this podcast with a second user of a second object hierarchy 154. The application sharing may therefore involve a copying of the media player session from the first object hierarchy 152 to the second object hierarchy 154. Because the media player session references some media objects stored in the first object hierarchy 152, the application sharing may also involve sharing the media objects referenced therein by copying the media objects to the second object hierarchy 154. However, the digital rights associated with the media objects may permit the transmission of the media objects to other object hierarchies only at a lower fidelity; accordingly, the computing environment may transmit to the second object hierarchy versions of the media objects transcoded to lower quality (e.g., a 24 kbps encoding rate.) Additionally, the second object hierarchy 154 may not include a media player application for the types of audio represented by the media objects. Accordingly, the first object hierarchy 152 may share a version of the media player application with the second object hierarchy 154; however, a reduced functionality version may be transmitted to the second user in compliance with the end-user license agreement of the media player application acquired by the first user. In this manner, the application, the media objects rendered thereby, and the application session generated by the first user may be shared with the second user in an automated manner by transmitting portions of the first object hierarchy 152 to the second object hierarchy 154, while complying with the digital rights of the components relating to the application session.

As a fifth variation of this third aspect, the application management service may facilitate the updating of applications with new content. Applications are often updated to new versions and with new content by patching binaries, inserting new resources, and altering or removing existing resources. Such updating may be performed by the application management service by obtaining application updates and deploying the updates to applications represented in the object hierarchy (e.g., by updating application resources contained in the object hierarchy, and/or inserting new resources as new objects in the object hierarchy.) The updates may be applied at the request of a user, who may have acquired new content to be exposed by the application; or may be retrieved by the application management service through a query to an application store; or may be pushed to the application management service b by an application store or an administration server; etc. The updated object hierarchy may then be transmitted to one or more devices, and may thereby achieve an updating of the applications of the computing environment with reduced reliance on the involvement of the user. Those of ordinary skill in the art may be able to devise many ways of updating the applications represented in the object hierarchy while implementing the techniques discussed herein.

As a sixth variation of this third aspect, the application management service may also permit the revocation of applications from the computing environment. This revocation may involve many scenarios, such as removing a mapping of an application to a device, de-authorizing a device in an authorized devices list of an application activation server, removing application resources from a device (e.g., by withholding from the device a portion of the object hierarchy containing the application resources), and completely decommissioning the application by removing all of the application resources from the object hierarchy and from all mapped devices. The revocation may be at the request of a user who wishes to uninstall the application from one or more devices, or upon expiration of a limited duration software license, or upon removing a device from the computing mesh, etc. As an exemplary embodiment of this variation, an application management system may include an application revocation component configured to revoke the application from at least one device in any of these manners. Those of ordinary skill in the art may be able to devise many ways of revoking applications from within computing environments represented by object hierarchies while implementing the techniques discussed herein.

These variations of these aspects may be included in many embodiments of the techniques discussed herein, including the exemplary method 60 of FIG. 3 and the exemplary system 86 of FIG. 4. Moreover, several such variations may be implemented in combination, and with other variations of these and other aspects of these techniques, to provide several advantages and/or reduce disadvantages with respect to the more basic embodiments illustrated in FIGS. 3-4. Some combinations may also provide synergistic advantages; for instance, an application discovery component may be cooperatively linked to an application acquisition component to present the discovery, purchasing, license acceptance, and user account creation of the procurement of an application as an integrated user experience.

Figure 10:
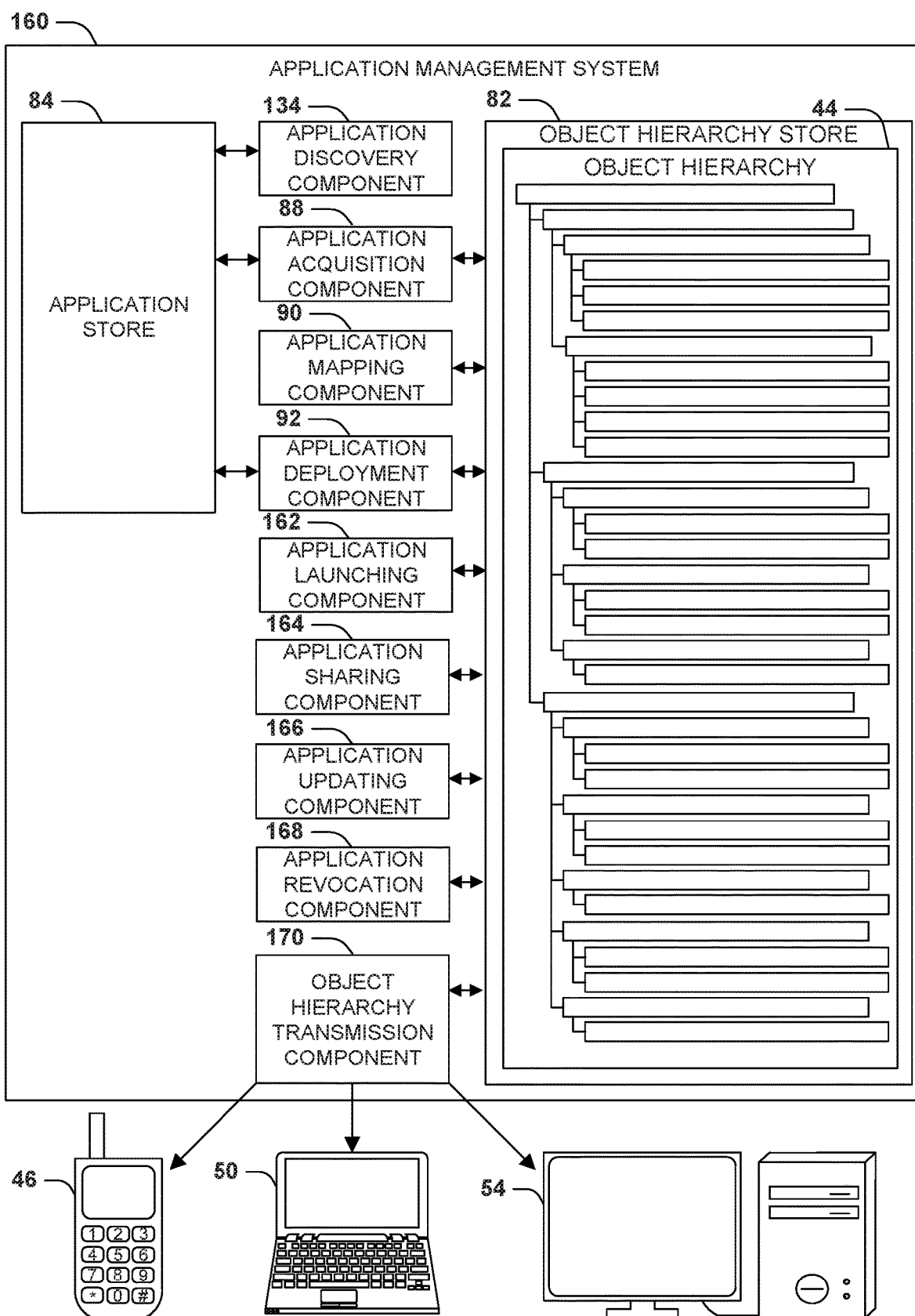
FIG. 10 is a component block diagram illustrating yet another exemplary system for managing the deployment of applications to an object hierarchy representing a computing environment upon at least one device.

FIG. 10 illustrates an exemplary system 160 for managing the deployment of applications in an object hierarchy 44 representing a computing environment upon at least one device (such as a cellphone device 46, a notebook computer 50, and a public workstation 54.) The exemplary system 160 of FIG. 10 embodies many of the variations discussed herein. The exemplary system 160 includes an object hierarchy store 82 configured to store the object hierarchy 44, and an application store 84 representing at least one application, respective applications comprising at least one application resource. The exemplary system 160 also includes an application discovery component 134, which is configured to receive from a user an application query, to select applications satisfying the application query, and to present selected applications to the user. The exemplary system 160 also includes an application acquisition component 88, which is configured to receive a request to install an application, to present an application license to a user through the device, and, upon receiving an acceptance of the application license from the user, to record the acceptance of the application license. The application acquisition component 88 is also configured to generate a user account representing a user of the application, and to broker an acquisition transaction with a user of the at least one device. Together, the application discovery component 134 and application acquisition component 88 facilitate the procurement of an application in the typical application life cycle.

The exemplary system 160 of FIG. 10 also includes an application mapping component 90, which is configured to map at least one device represented in the object hierarchy 44 to at least one installed application. The exemplary system 160 also includes an application deployment component 92, which is configured to deploy the at least one installed application in the object hierarchy 44 by configuring the application with respect to at least one of the device and a user of the device. Together, the application mapping component 90 and the application deployment component 92 facilitate the installation of the application within the object hierarchy in the typical application life cycle.

The exemplary system 160 of FIG. 10 also includes an application launching component 162, which is configured to launch the application on the at least one device. The exemplary system 160 also includes an application sharing component 164, which is configured to receive a request to share an application with a user, and, upon receiving the request to share the application, sharing with the user a portion of the object hierarchy comprising at least one of: the application, an application session, an application configuration, and at least one data object generated by the application. The exemplary system 160 also includes an application updating component 166, which is configured to update at least one application resource in the object hierarchy 44. Together, the application launching component 162, application sharing component 164, and application updating component 166 facilitate the execution of the application on one or more devices in the typical application life cycle.

The exemplary system 160 of FIG. 10 also includes an application revocation component 168, which is configured to revoke the application (e.g., by de-mapping the application from the representation of one or more devices in the object hierarchy, removing application resources from one or more devices, and/or completely decommissioning the application by completely removing it from the object hierarchy.) The application revocation component 168 thereby facilitates the uninstallation of the application in the typical application life cycle.

Finally, the exemplary system 160 also includes an object hierarchy transmission component 170, which is configured to transmit at least a portion of the object hierarchy 44 to the at least one device. The object hierarchy 44 may be modified by many of the components of the application management system 160, and the modifications of the object hierarchy 44 may be synchronized with the one or more devices represented therein to effectuate the updating of the application set of the computing environment. By combining these many variations of the techniques discussed herein, the exemplary system 160 thereby provides comprehensive application management services for administrating a large set of applications through the typical application life cycle among many devices comprising a computing mesh.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
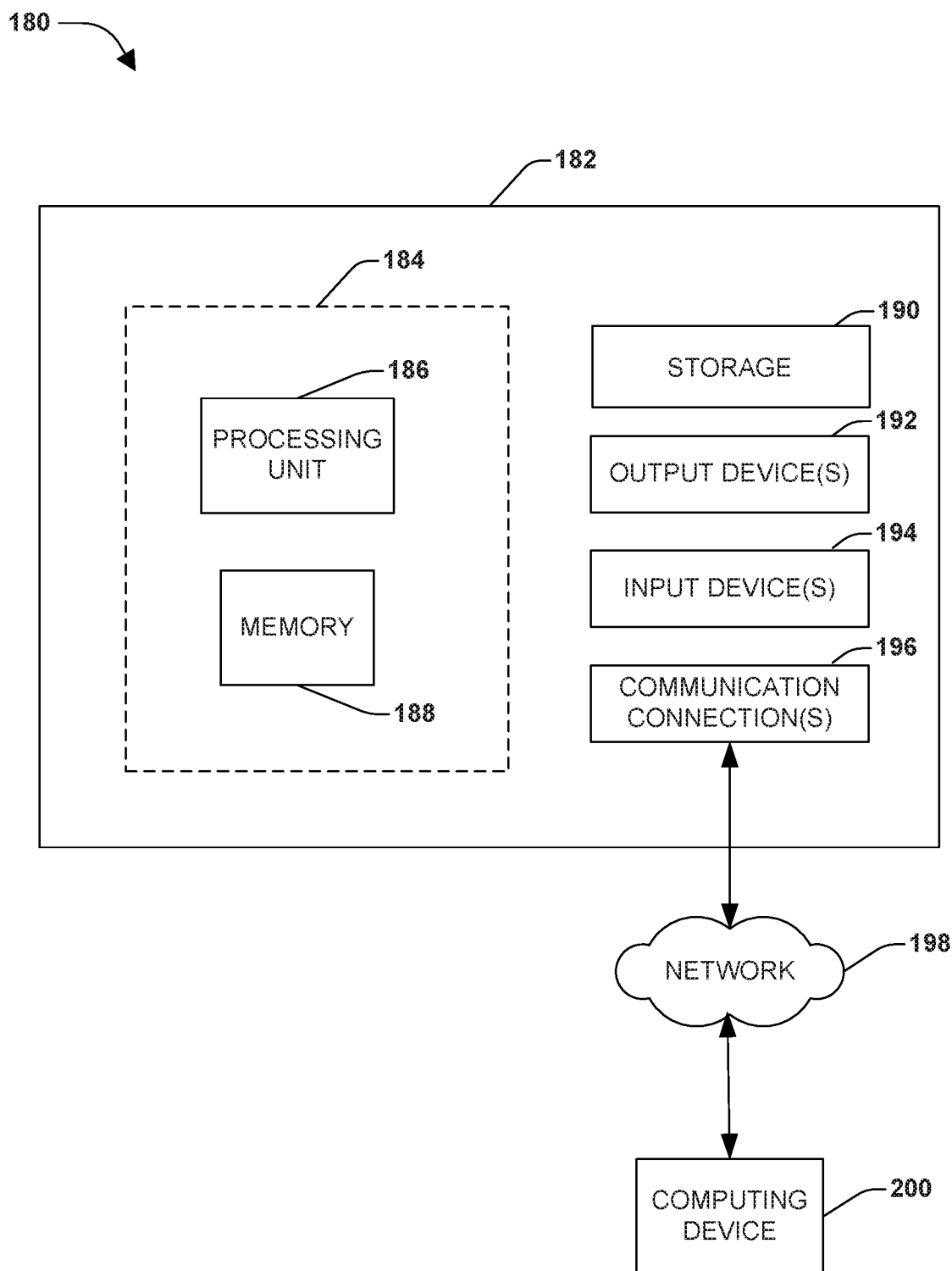
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 11 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 11 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 100 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for a first device storing a first object hierarchy, comprising:
   receiving, from a second device storing a second object hierarchy comprising a first version of an application, a reduced-functionality second version of the application, and application-specific data objects, a selected portion of the second object hierarchy including the reduced-functionality second version of the application and the application-specific data objects;
   synchronizing the selected portion of the second object hierarchy including the reduced-functionality second version of the application and the application-specific data objects with the stored first object hierarchy; and
   executing the reduced-functionality second version of the application to render the application-specific data objects.

2. The method of claim 1, wherein receiving the reduced-functionality second version of the application comprises determining the first device is not associated with a license to the application.

3. The method of claim 1, wherein the synchronized application-specific data objects are reduced-quality versions of the application-specific data objects of the object hierarchy.

4. The method of claim 3, further comprising:
   determining digital rights associated with the application-specific data objects; and
   determining to synchronize the reduced-quality versions of the application-specific data objects based on the digital rights.

5. The method of claim 1, comprising:
   transmitting a request for the application to the second device, the request including an indication that the first device is not associated with a license to the application.

6. The method of claim 1, wherein the application is a media player application, wherein the synchronized selected portion of the object hierarchy includes a media player session object, and wherein the application-specific data objects are media objects.

7. The method of claim 6, further comprising:
   transcoding the media objects in the selected portion of the object hierarchy to a lower fidelity prior to synchronizing the selected portion of the object hierarchy.

8. The method of claim 7, further comprising:
   determining digital rights associated with the media objects; and
   determining to transcode the media objects in the selected portion of the object hierarchy to a lower fidelity based on the digital rights.

9. A first device comprising:
   a memory storing a first object hierarchy; and
   a processor to execute instructions stored in the memory to cause the first device to:
      receive, from a second device storing a second object hierarchy comprising a first version of an application, a reduced-functionality second version of the application, and application-specific data objects, a selected portion of the second object hierarchy including the reduced-functionality second version of the application and the application-specific data objects;
      synchronize the selected portion of the second object hierarchy including the reduced-functionality second version of the application and the application-specific data objects with the stored first object hierarchy; and
      execute the reduced-functionality second version of the application to render the application-specific data objects.

10. The device of claim 9, wherein receipt of the reduced-functionality second version of the application comprises determination of the first device is not associated with a license to the application.

11. The device of claim 9, wherein the synchronized application-specific data objects are reduced-quality versions of the application-specific data objects of the object hierarchy.

12. The device of claim 11, the processor to execute instructions stored in the memory to cause the first device to:
   determine digital rights associated with the application-specific data objects; and
   determine to synchronize the reduced-quality versions of the application-specific data objects based on the digital rights.

13. The device of claim 9, the processor to execute instructions stored in the memory to cause the first device to:
   transmit a request for the application to the second device, the request including an indication that the first device is not associated with a license to the application.

14. The device of claim 9, wherein the application is a media player application, wherein the synchronized selected portion of the object hierarchy includes a media player session object, and wherein the application-specific data objects are media objects.

15. The device of claim 14, a processor to execute instructions stored in the memory to cause the first device to:
   determine digital rights associated with the media objects;
   determine to transcode the media objects in the selected portion of the object hierarchy to a lower fidelity based on the digital rights; and
   transcode the media objects in the selected portion of the object hierarchy to a lower fidelity prior to synchronizing the selected portion of the object hierarchy.

16. A non-transitory computer-readable medium storing instructions executable by a processor to cause a device to:
   receive, from a second device storing a second object hierarchy comprising a first version of an application, a reduced-functionality second version of the application, and application-specific data objects, a selected portion of the second object hierarchy including the reduced-functionality second version of the application and the application-specific data objects;
   synchronize the selected portion of the second object hierarchy including the reduced-functionality second version of the application and the application-specific data objects with the stored first object hierarchy; and
   execute the reduced-functionality second version of the application to render the application-specific data objects.

17. The medium of claim 16, wherein the synchronized application-specific data objects are reduced-quality versions of the application-specific data objects of the object hierarchy, and
   wherein the instructions are further executable by the processor to cause the device to:

determine digital rights associated with the application-specific data objects; and determine to synchronize the reduced-quality versions of the application-specific data objects based on the digital rights.

18. The medium of claim 16, wherein the instructions are further executable by the processor to cause the device to transmit a request for the application to the second device, the request including an indication that the first device is not associated with a license to the application.

19. The medium of claim 16, wherein the application is a media player application, wherein the synchronized selected portion of the object hierarchy includes a media player session object, and wherein the application-specific data objects are media objects.

20. The medium of claim 19, wherein the instructions are further executable by the processor to cause the device to:

determine digital rights associated with the media objects;

determine to transcode the media objects in the selected portion of the object hierarchy to a lower fidelity based on the digital rights; and transcode the media objects in the selected portion of the object hierarchy to a lower fidelity prior to synchronizing the selected portion of the object hierarchy.

* * * * *